(12) United States Patent
Rozman et al.

(10) Patent No.: US 7,885,089 B2
(45) Date of Patent: Feb. 8, 2011

(54) ELECTRIC POWER GENERATION AND CONVERSION WITH CONTROLLED MAGNETICS

(75) Inventors: Gregory I. Rozman, Rockford, IL (US); Jacek F. Gieras, Glastonbury, CT (US); Andreas C. Koenig, Machesney Park, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 449 days.

(21) Appl. No.: 12/186,737

(22) Filed: Aug. 6, 2008

(65) Prior Publication Data

US 2010/0034003 A1     Feb. 11, 2010

(51) Int. Cl.
*H02M 5/42*     (2006.01)
(52) U.S. Cl. .................... 363/98; 363/171; 363/64; 318/801
(58) Field of Classification Search ............ 363/16–17, 363/34–39, 41–43, 59, 65, 71, 89, 98, 132, 363/171; 318/34, 47, 105, 139, 440, 801, 318/811; 290/29, 37, 44, 55; 307/18, 58, 307/67–69, 24
See application file for complete search history.

(56) References Cited

U.S. PATENT DOCUMENTS

| | | | | |
|---|---|---|---|---|
| 4,841,429 A | | 6/1989 | McClanahan et al. | |
| 5,250,890 A | * | 10/1993 | Tanamachi et al. | 318/811 |
| 5,355,296 A | * | 10/1994 | Kuo et al. | 363/43 |
| 5,537,307 A | * | 7/1996 | Hirose et al. | 363/79 |
| 5,984,173 A | * | 11/1999 | Edwards | 323/207 |
| 6,256,213 B1 | * | 7/2001 | Illingworth | 363/89 |
| 7,092,267 B2 | * | 8/2006 | Carlson et al. | 363/79 |
| 7,417,875 B2 | * | 8/2008 | Chandrasekaran et al. | 363/17 |

* cited by examiner

*Primary Examiner*—Rajnikant B Patel
(74) *Attorney, Agent, or Firm*—Stephen G. Mican

(57) ABSTRACT

A power conversion system comprises: a source of multiphase high frequency alternating current (AC) electrical input power; a high frequency controlled magnetics transformer for each phase of the multiphase high frequency AC input power, with each transformer having a primary winding coupled to its respective phase of the multiphase high frequency AC input power, at least one secondary winding that produces high frequency AC output power and at least one control winding responsive to a direct current (DC) control signal that changes the high frequency output power in proportion to the amplitude of the DC control signal; a power converter that receives the multiphase high frequency AC output power from each high frequency transformer secondary and converts it to system output power without the high frequency AC content; and a system controller responsive to the system output power that produces a DC control signal for each control winding that changes in amplitude in response to changes in a measured parameter of the system output power.

22 Claims, 5 Drawing Sheets

ELECTRIC POWER GENERATION AND CONVERSION WITH CONTROLLED MAGNETICS

FIELD OF THE INVENTION

The invention relates to electrical power generation and conversion systems, and more particularly to electrical power generation and conversion systems that employ electromagnetic devices with controllable magnetic reluctance.

BACKGROUND OF THE INVENTION

Electrical power generation and conversion systems convert mechanical power supplied by a prime mover, such as a gas turbine or internal combustion engine, to direct current (DC) or alternating current (AC) electrical power. Typically, the prime mover drives a wound field synchronous generator. Wound field synchronous generators are desirable because it is easy to regulate their output by way of excitation current control. In the case of AC power generation, the AC frequency of the generated power will be proportional to the rotational velocity of the wound field synchronous generator. This is satisfactory for variable speed variable frequency (VSVF) power systems. Variable speed constant frequency (VSCF) systems and DC power systems may employ a downstream power converter with such a generator.

To improve power density of components used in such power generation and conversion systems, it is necessary to establish a relatively high fundamental frequency of operation. To improve efficiency and reduce thermal management, it is desirable to minimise power converter switching losses.

The main disadvantage of the wound field synchronous generator of the conventional type is its sliding rings and brushes for its rotor. The main disadvantage of the wound synchronous generator of the brushless type is its complex rotor structure.

However, it is possible to employ a synchronous generator of the permanent magnet (PM) type. The main disadvantage of PM generators is voltage regulation. Although it is possible to overcome this disadvantage with special designs that add a field winding for voltage control purposes. The extra field winding may be in the rotor, in which case it has the same disadvantage of sliding rings and brushes as a wound field synchronous generator has. The extra field winding may alternatively be in the stator, in which case the winding either magnifies or reduces the rotor PM magnetic flux or diverts the main magnetic flux in the stator core. In all cases, the additional field winding contributes to an increase in the volume and weight of the PM generator.

It is also possible to employ a generator of the induction type. The main disadvantage of self-excited induction generators are large running capacitors and poor voltage regulation or solid-state converters that must provide large excitation power that exceeds twenty five percent of the generator rating.

SUMMARY OF THE INVENTION

The invention generally comprises a power conversion system comprising: a source of multiphase high frequency alternating current (AC) electrical input power; a high frequency controlled magnetics transformer for each phase of the multiphase high frequency AC input power, with each transformer having a primary winding coupled to its respective phase of the multiphase high frequency AC input power, at least one secondary winding that produces high frequency AC output power and at least one control winding responsive to a direct current (DC) control signal that changes the high frequency output power in proportion to the amplitude of the DC control signal; a power converter that receives the multiphase high frequency AC output power from each high frequency transformer secondary and converts it to system output power without the high frequency AC content; and a system controller responsive to the system output power that produces a DC control signal for each control winding that changes in amplitude in response to changes in a measured parameter of the system output power.

DETAILED DESCRIPTION OF THE INVENTION

Figure 1:
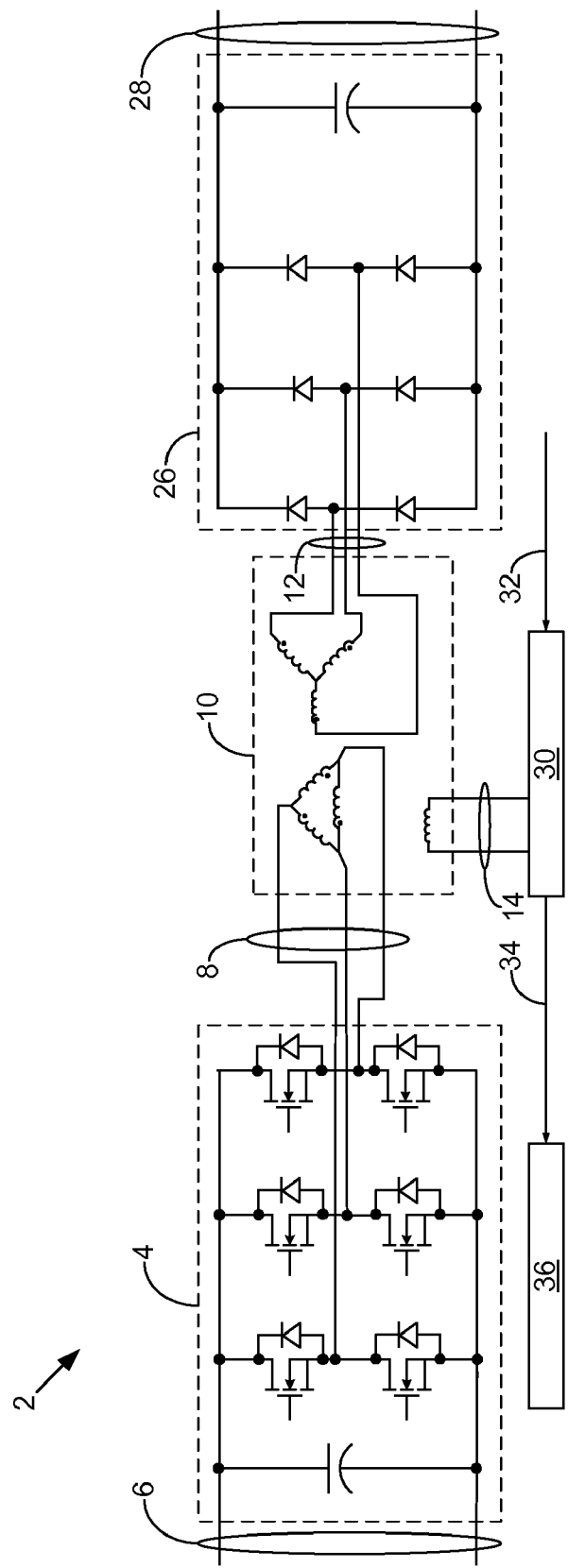
FIG. 1 is a power conversion system according to a first possible embodiment of the invention.

FIG. 1 is a power conversion system 2 according to a first possible embodiment of the invention. a source of multiphase high frequency alternating current (AC) input power 4, such as a multiphase inverter supplied with direct current (DC) power by a DC input power bus 6, delivers high frequency power on a multiphase AC input power bus 8. Alternatively, the high frequency AC source may be a multiphase high frequency AC generator, such as a permanent magnet (PM) generator, powered by a prime mover.

A multiphase controlled magnetics transformer 10 receives the multiphase high frequency AC input power on the multiphase high frequency AC input power bus 8 and transforms it to multiphase high frequency AC output power on a multiphase AC output power bus 12. The characteristics of the multiphase controlled magnetics transformer 10 are responsive to a DC output signal that the multiphase controlled magnetics transformer 10 receives from a DC control signal bus 14.

The multiphase controlled magnetics transformer 10 may comprise a high frequency transformer for each phase of the multiphase high frequency input power, with each transformer having a primary winding coupled to its respective phase of the multiphase high frequency AC input power on the multiphase AC input power bus 8, at least one secondary winding coupled to its respective phase on the multiphase AC output power bus 12 that produces high frequency AC output power and at least one control winding responsive to the DC control signal on the DC control signal bus 14 that changes the high frequency output power of its respective high frequency transformer in proportion to the amplitude of the DC control signal on the DC control signal bus 14.

Figure 2:
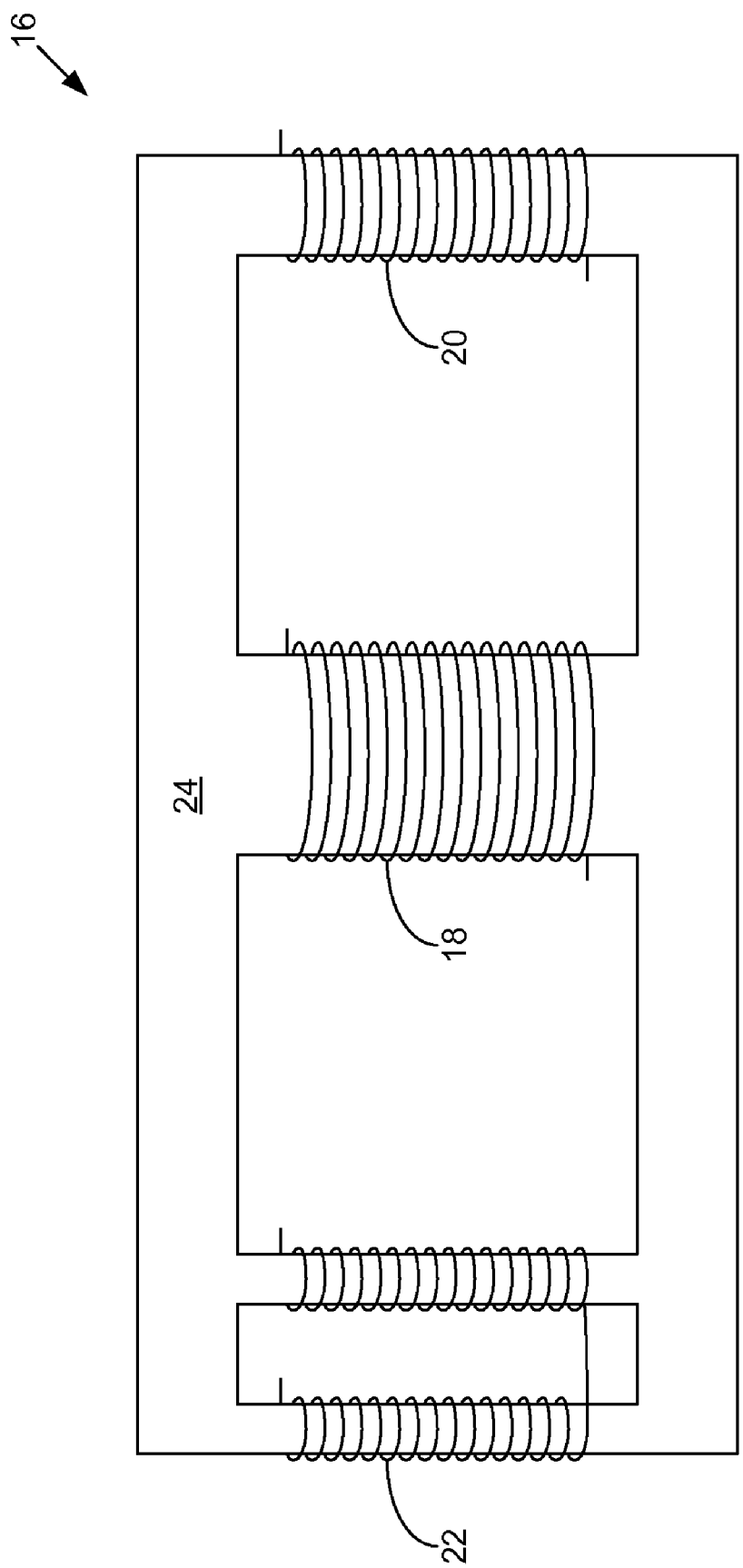
FIG. 2 is a side view of a single-phase controlled magnetics transformer that may be suitable for use in the first possible embodiment of the invention.

FIG. 2 is a side view of a single-phase controlled magnetics transformer 16 with a primary winding 18, a secondary winding 20 and a control winding 22 wound on a single ferromagnetic core 24. By way of example only, FIG. 1 shows a three-phase system, wherein the multiphase controlled magnetics transformer 10 would comprise three of the single phase controlled magnetic transformers 16. The ferromagnetic core 24 preferably comprises a ferromagnetic core material and construction that exhibits relatively low eddy currents at high frequencies, such as a ferrite or powdered metal composition or strip wound construction.

The primary windings 18 of the single-phase transformers 16 may connect together in a delta configuration, as shown in FIG. 1, or a wye configuration, according to convenience of coupling to the power source 4 by way of the input power bus 8. The secondary windings 20 of the single-phase transformers 16 may connect together in a wye connection, as shown in FIG. 1, or a delta configuration, according to convenience of coupling to the output power bus 12. The control windings 22 of the single-phase transformers 16 may connect in series or in parallel, depending on the level of the control signal on the DC control signal bus 14 or other electrical factors.

A multiphase power converter 26 receives the multiphase high frequency AC output power on the multiphase AC output power bus 12 and converts it to system output power without the high frequency AC content, such as DC power on a DC output bus 28. The power converter 26 may comprise a multiphase rectifier as shown in FIG. 1, or it may comprise a multiphase inverter. If the power converter 26 comprises a multiphase inverter, the power conversion system 2 may be capable of bi-directional power flow, that is, power transfer from the DC output power bus 28 back to the DC input power bus 6. The feature of bidirectional power flow allows the stored energy in electrical loads, such as motors, to regenerate back to the power source 4, leading to an increase in overall energy efficiency of the power conversion system 2.

The power conversion system 2 may have a system controller 30 that senses an electrical system parameter as represented by an electrical system parameter signal on a parameter signal line 32, such as the level of voltage on the DC output power bus 28, and compares it to a reference level to generate the DC control signal on the DC control signal bus 14. The DC control signal on the control signal bus 14 changes the characteristics of the multiphase controlled magnetics transformer 10 to bring the level of the measured electrical system parameter close to the compared reference level. More specifically, the current that the DC control signal generates in the control winding 18 of each single phase transformer 16 in the multiphase controlled magnetics transformer 10 tends to change the reluctance of the magnetic flux path between its primary winding 20 and secondary winding 22 in its core 24, thereby changing the transformation of power between the high frequency AC input power bus 8 and the high frequency AC output power bus 12.

If the power source 4 comprises a multiphase inverter as shown in FIG. 1, the system controller 30 may also generate inverter control signals on an inverter control bus 34 to improve regulation of the power conversion system 2. In this case, a gate drives circuit 36 receives the inverter control signals on the inverter control bus 34 and generates corresponding gate signals that operate gates in the power source 4. These gate signals may be pulse width modulation (PWM) signals, and further they may operate the power source 4 in current mode control.

Figure 3:
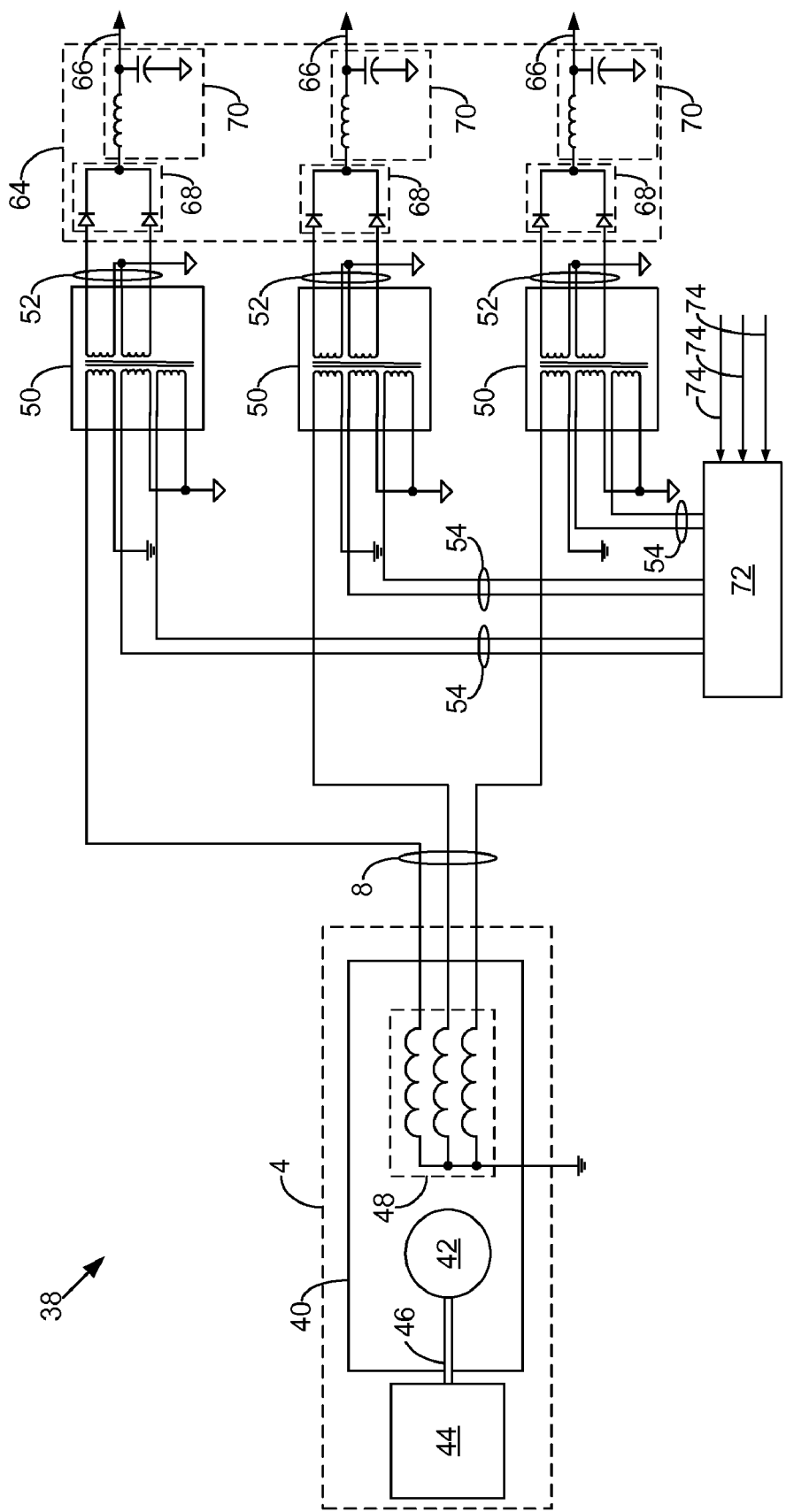
FIG. 3 is a power conversion system according to a second possible embodiment of the invention.

FIG. 3 is a power conversion system 38 according to a second possible embodiment of the invention. It comprises the source of multiphase high frequency AC input power 4, shown as a multiphase high frequency AC generator 40, such as a permanent magnet (PM) generator, comprising a rotor 42 powered by a prime mover 44 by means of a drive shaft 46 and a multiphase stator 48 that develops multiphase high frequency AC on the multiphase AC input power bus 8. Alternatively, the power source 4 may be a multiphase inverter as shown in FIG. 1.

A single-phase controlled magnetics transformer 50 for each phase of the input power bus 8 receives high frequency input power for its respective phase from the input power bus 8. Each single-phase controlled magnetics transformer has two secondary windings coupled to respective sides of a respective single-phase centre-tapped output power bus 52. The centre-tap of each output power bus 52 connects to electrical ground. Each single phase controlled magnetics transformer 50 has a control winding for each of its secondaries that is responsive to a respective DC control signal on a DC control signal bus 54 that changes the high frequency output power of its respective secondary in proportion to the amplitude of the DC control signal on the respective DC control signal bus 54.

Figure 4:
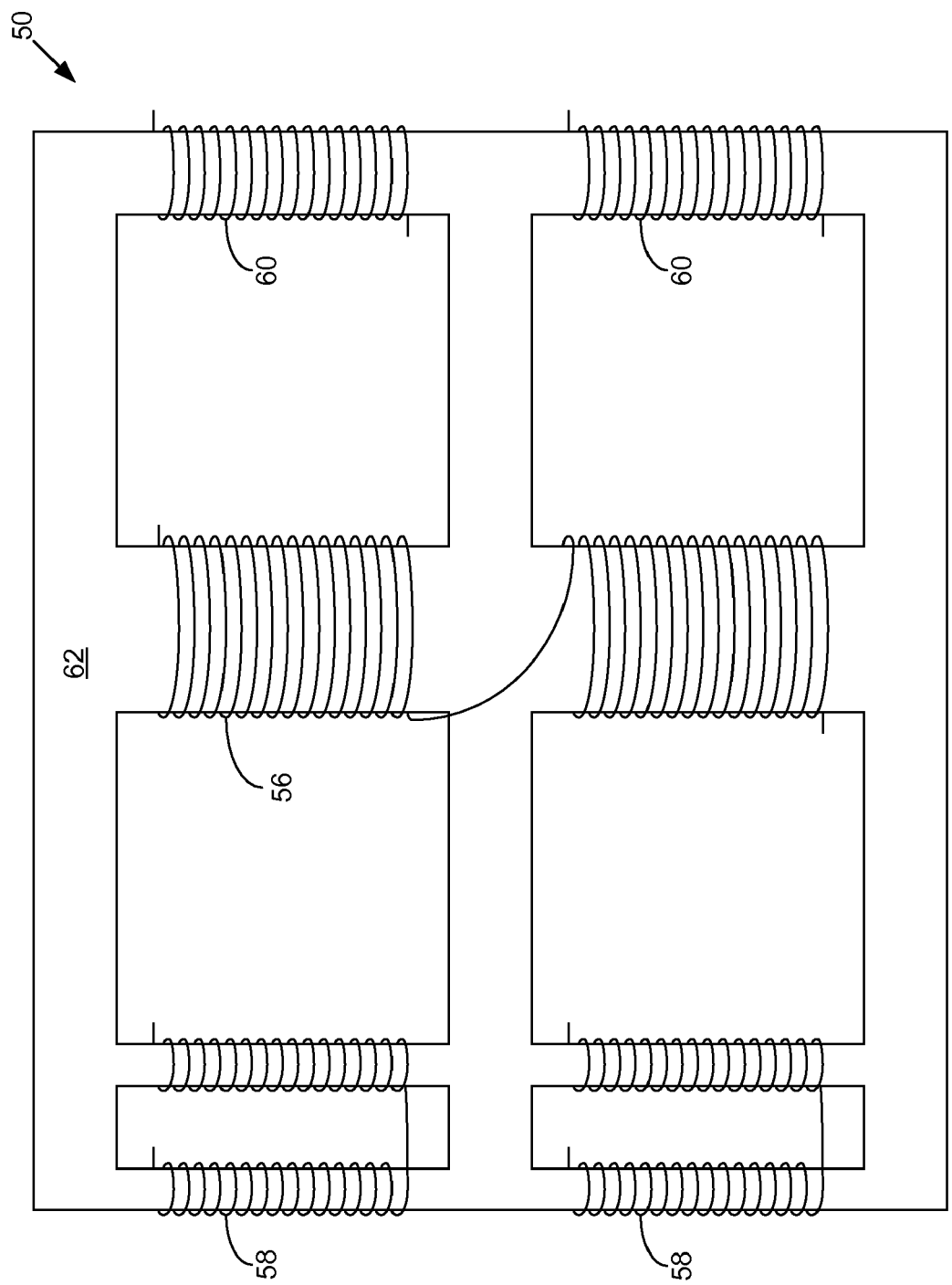
FIG. 4 is a side view of a controlled magnetics transformer that may be suitable for use in the second possible embodiment of the invention.

FIG. 4 is a side view of the single-phase controlled magnetics transformer 50 with a primary winding 56, two secondary windings 58, and two control windings 60, one for each of the secondary windings 58, all wound on a single ferromagnetic core 62. The ferromagnetic core 62 preferably comprises a ferromagnetic core material and construction that exhibits relatively low eddy currents at high frequencies, such as a ferrite or powdered metal composition or strip wound construction.

The power conversion system 38 also comprises a power converter 64 that receives the AC output power from each single-phase AC power output bus 52 and converts single-phase high frequency AC output power on each of the AC power output buses 52 to DC output power on a respective DC output power bus 66. The power converter 64 comprises a single phase full wave rectifier 68 for each single phase AC power output bus 52 that rectifies the high frequency AC output power and an AC filter 70 for each full wave rectifier 68 that converts the rectified high frequency AC output power of its respective full wave rectifier 68 to filtered DC output power on its respective DC output power bus 66.

The power conversion system 38 may have a system controller 72 that senses an electrical system parameter of the DC output power on each DC output power bus 66, as represented by an electrical system parameter signal on a respective parameter signal line 74, such as the level of voltage on its respective DC output power bus 66. The system controller 72 compares each parameter signal to a reference level to generate its respective DC control signal on its respective DC control signal bus 54. The respective DC control signal changes the characteristics of its respective controlled magnetics transformer 50 to bring the level of the measured electrical system parameter close to the compared reference level. The system controller 72 may employ current mode control to improve dynamic voltage regulation of the power conversion system 38.

Figure 5:
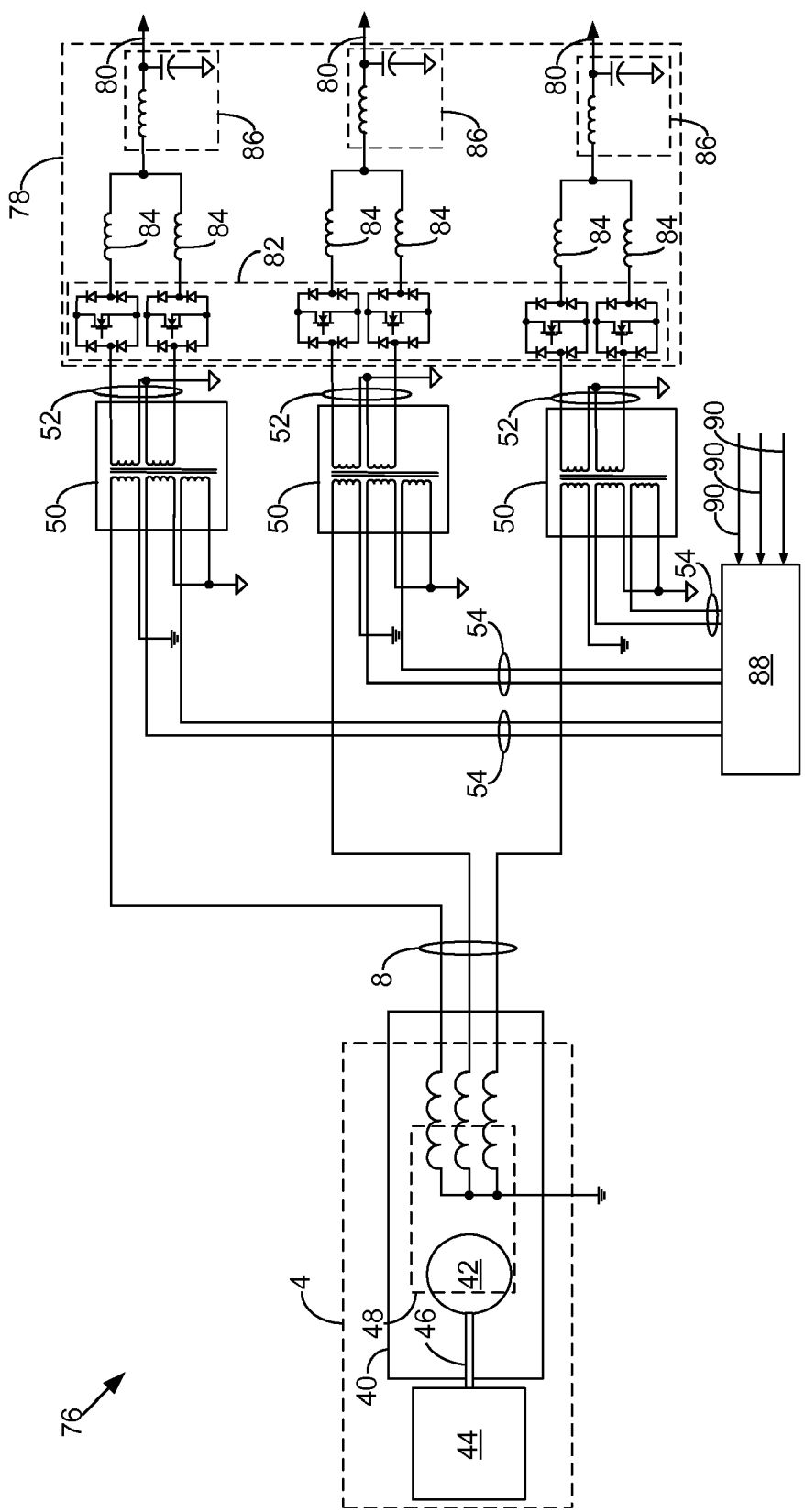
FIG. 5 is a power conversion system according to a third possible embodiment of the invention.

FIG. 5 is a power conversion system 76 according to a third possible embodiment of the invention. It is similar to the power conversion system 38 hereinbefore described in connection with FIG. 3, except that a power converter 78 receives the AC output power from each single phase AC power output bus 52 and converts single phase high frequency AC output power on each of the AC power output buses 52 to AC output power of low frequency without the high frequency content on a respective multiphase low frequency AC output power bus 80.

The power converter 78 comprises a multiphase high frequency AC cycloconverter 82 that converts the high frequency AC power output on the AC output buses 52 to a lower desired frequency AC power on corresponding low frequency AC power output buses 80 Commutating inductors 84 on the outputs of the cycloconverter 82 may reduce overcurrent stress due to overlap operation. High frequency AC filters 86 may suppress any residual high frequency AC content on the low frequency AC power output buses 80.

The power conversion system 76 may have a system controller 88 that senses an electrical system parameter on each phase of the low frequency output power buses 80, as represented by an electrical system parameter signal on a respective parameter signal line 90, such as the level of voltage on its respective AC output power bus 82. The system controller 88 compares each parameter signal to a reference level to generate its respective DC control signal on its respective DC control signal bus 54. The respective DC control signal changes the characteristics of its respective controlled magnetics transformer 50 to bring the level of the measured electrical system parameter close to the compared reference level. The system controller 88 may employ current mode control to improve dynamic voltage regulation of the power conversion system 76. The system controller 88 may also provide gate control signals to operate the cycloconverter 82.

The cycloconverter 80 provides bidirectional power flow that enables operation of the power conversion system 76 with inductive and capacitive loads. The power conversion system 76 may employ a multiphase high frequency AC generator 40 of the induction type as well as the PM type, if the cycloconverter 82 serves as an excitation source for the generator 40. In this case, the system controller 88 will drive the cycloconverter 82 at a frequency slightly less than the rotational frequency of the rotor 42 to develop power.

The described embodiments of the invention are only some illustrative implementations of the invention wherein changes and substitutions of the various parts and arrangement thereof are within the scope of the invention as set forth in the attached claims.

The claimed invention is:

1. A power conversion system that comprises:
    a source of multiphase high frequency alternating current (AC) electrical input power;
    a high frequency controlled magnetics transformer for each phase of the multiphase high frequency AC input power, with each transformer having a primary winding coupled to its respective phase of the multiphase high frequency AC input power, at least one secondary winding that produces high frequency AC output power and at least one control winding responsive to a direct current (DC) control signal that changes the high frequency output power in proportion to the amplitude of the DC control signal;
    a power converter that receives the multiphase high frequency AC output power from each high frequency transformer secondary and converts it to system output power without the high frequency AC content; and
    a system controller responsive to the system output power that produces a DC control signal for each control winding that changes in amplitude in response to changes in the a measured parameter of the system output power.

2. The power conversion system of claim 1, wherein the high frequency AC source comprises a multiphase AC inverter coupled to a DC bus.

3. The power conversion system of claim 1, wherein the high frequency AC source comprises a high frequency permanent magnet (PM) generator.

4. The power conversion system of claim 3, further comprising a prime mover coupled to the PM generator.

5. The power conversion system of claim 1, wherein the power converter comprises a multiphase rectifier.

6. The power conversion system of claim 1, wherein the power converter comprises an inverter.

7. The power conversion system of claim 1, wherein the power converter comprises a cycloconverter.

8. The power conversion system of claim 1, wherein the power converter supplies DC power to at least one DC bus.

9. The power conversion system of claim 8, wherein the power converter supplies DC power to multiple DC buses equal in number to the number of AC phases of the high frequency AC source.

10. The power conversion system of claim 1, wherein the power converter supplies multiphase AC power to an AC bus.

11. A power conversion system that comprises:
    a multiphase inverter coupled to a direct current (DC) input bus that converts DC power on the DC input bus to multiphase high frequency alternating current (AC) electrical input power;
    a high frequency controlled magnetics transformer for each phase of the multiphase high frequency AC input power, with each transformer having a primary winding coupled to its respective phase of the multiphase high frequency AC input power, at least one secondary winding that produces high frequency AC output power and at least one control winding responsive to a direct current (DC) control signal that changes the high frequency output power in proportion to the amplitude of the DC control signal;
    a power converter that receives the multiphase high frequency AC output power from each high frequency transformer secondary and converts it to system output power without the high frequency AC content; and
    a system controller responsive to the system output power that produces a DC control signal for each control winding that changes in amplitude in response to changes in the voltage level of the system output power.

12. The power conversion system of claim 11, wherein the power converter comprises a multiphase rectifier coupled to a DC output bus that converts the multiphase high frequency AC output power to DC power on the DC output bus.

13. The power conversion system of claim 11, wherein the power converter comprises multiple single phase rectifiers that supply DC power to multiple DC buses equal in number to the number of AC phases of the high frequency AC output signal.

14. The power conversion system of claim 11, wherein the power converter comprises an inverter coupled to a DC output bus that converts the multiphase high frequency AC output power to DC power on the DC output bus.

15. The power conversion system of claim 14, wherein the inverter converts DC power on the DC output bus to multiphase high frequency AC power for bi-directional power flow.

16. A power conversion system that comprises:
    a permanent magnet (PM) generator that generates high frequency alternating current (AC) electrical input power;
    a high frequency controlled magnetics transformer for each phase of the multiphase high frequency AC input power, with each transformer having a primary winding coupled to its respective phase of the multiphase high frequency AC input power, at least one secondary winding that produces high frequency AC output power and at least one control winding responsive to a direct current (DC) control signal that changes the high frequency output power in proportion to the amplitude of the DC control signal;
    a power converter that receives the multiphase high frequency AC output power from each high frequency transformer secondary and converts it to system output power without the high frequency AC content; and a system controller responsive to the system output power that produces a DC control signal for each control winding that changes in amplitude in response to changes in the voltage level of the system output power.

17. The power conversion system of claim 16, further comprising a prime mover coupled to the PM generator.

18. The power conversion system of claim 16, wherein the power converter comprises a multiphase rectifier coupled to a DC output bus that converts the multiphase high frequency AC output power to DC power on the DC output bus.

19. The power conversion system of claim 16, wherein the power converter comprises multiple single phase rectifiers that supply DC power to multiple DC buses equal in number to the number of AC phases of the high frequency AC output signal.

20. The power conversion system of claim 16, wherein the power converter comprises an inverter coupled to a DC output bus that converts the multiphase high frequency AC output power to DC power on the DC output bus.

21. The power conversion system of claim 16, wherein the inverter converts DC power on the DC output bus to multiphase high frequency AC power for bidirectional power flow.

22. The power conversion system of claim 16, wherein the power converter comprises a cycloconverter coupled to a multiphase AC output bus that supplies AC power to the multiphase AC output bus at a lower frequency than the high frequency AC output power.

* * * * *